United States Patent [19]

Barleon et al.

[11] 4,073,682
[45] Feb. 14, 1978

[54] NUCLEAR REACTOR CORE CATCHING APPARATUS

[75] Inventors: Leopold Barleon, Karlsruhe; Stefan Dorner, Pforzheim; Odo Goetzmann, Philippsburg; Guenter Kussmaul, Karlsruhe, all of Germany

[73] Assignee: Gesellschaft fuer Kernforschung, Karlsruhe, Germany

[21] Appl. No.: 533,250

[22] Filed: Dec. 16, 1974

[30] Foreign Application Priority Data

Dec. 21, 1973 Germany ............................ 2363845

[51] Int. Cl.² .............................................. G21C 9/00
[52] U.S. Cl. .......................................... 176/38; 176/87
[58] Field of Search ......................... 176/37, 38, 40, 87

[56] References Cited

U.S. PATENT DOCUMENTS

| 2,837,474 | 6/1958 | Cartledge | 204/154.2 |
| 2,910,379 | 10/1959 | Gurinsky | 117/65 |
| 2,926,111 | 2/1960 | Schweitzer | 148/6.11 |
| 2,994,651 | 8/1961 | Spence | 204/154.2 |
| 3,629,064 | 12/1971 | Zivi | 176/38 |
| 3,664,923 | 5/1972 | Connolly | 176/40 |

OTHER PUBLICATIONS

Kotsch, Heinz Neve Huette, 12:350-355 (June 1967), German Nuclear Science Abstracts, vol. 24, No. 7, 12457.
Nuclear Science Abstracts, vol. 26, No. 1, 43457, Sept. 30, 1972.
Nuclear Science Abstracts, vol. 22, No. 24, 52275, Dec. 31, 1968.
Nuclear Science Abstracts, vol. 22, No. 2, 2590, Jan. 1968.
Transactions of the A.N.S., vol. 13, No. 2, Nov. 13, 1970, pp. 720 & 721.

*Primary Examiner*—Verlin R. Pendegrass
*Assistant Examiner*—Ralph Palo

[57] ABSTRACT

An apparatus for containing the components of a nuclear reactor core during a core-melt-down accident, comprising a container consisting at least its inner surface of a highly temperature resistant material.

5 Claims, 4 Drawing Figures

NUCLEAR REACTOR CORE CATCHING APPARATUS

REFERENCE TO RELATED APPLICATIONS

Reference is made to copending application No. (K1) filed concurrently herewith and assigned to the assignee of the present application.

BACKGROUND OF THE INVENTION

1. Field of the Invention

The invention relates to a nuclear core catching apparatus adapted to be disposed below the core of a nuclear reactor for containing the components of a nuclear reactor core during a core-melt-down accident.

2. Description of the Prior Art

If in a loss-of-coolant accident during the operation of a nuclear reactor the emergency core cooling system fails, parts of the core may melt as a result of the heat produced during the rapid decay of the fission products formed by fission of the nuclear fuel atoms during operation of the nuclear reactor.

Following a loss-of-coolant accident, a nuclear reactor is rapidly shut down by insertion of all control rods into the reactor core. However, even if the reactor is properly shut down and heat production by nuclear fission has ended, the decay of the fission products in the nuclear reactor core may still generate sufficient heat to melt the core if the core emergency cooling system fails to cool the core after reactor shutdown.

How serious such a core melt-down becomes, that is particularly, how long the melt remains liquid thereby forming a threat of destruction to the reactor vessel or even the reactor containment, depends to a great extent on the degree of removal of the fission products from the nuclear fuel. Removal of the fission products from the melt naturally reduces the heat generation in the melt. However, knowledge of the size of any heat sources remaining in the melt is considered to be necessary for the determination of apparatus designed for the protection of the containment, such as core catchers. Each core catcher must be designed for accommodation of all the heat that may be generated in a core after reactor shutdown. In accordance with the present state of the art, it is believed that about 65 ± 15% of all radioactive heat sources remain in the melt after core melt-down.

It is possible that, as a result of a core melt-down, the reactor vessel bottom is melted or even the concrete foundation of the containment is destroyed so that fission products are released. This, of course, forms a great threat to the environment.

It is furthermore possible, particularly in water-cooled reactors, that exotherm chemical reactions take place between the coolant and the fuel rod cladding or other structural materials which usually result in the formation of hydrogen. However, such reactions could also occur in gas cooled reactors if, for example, a break occurs in the steam generator resulting in a water break-in into the core melt.

To avoid the formation of a critical mass after a core-melt-down accident, a core catcher has been proposed (German DOS No. 2,259,071) which consists of a number of superimposed pan-type containers with a central body having a conical head at its upper end. Below its conical head, the central body has two superposed grid structures which are provided with vanes and which distribute the melt and retain fuel particles of various sizes. The liquid melt passes through the grid structures and is retained in the pan-type containers disposed below the grid structures.

Such core catching containers have the purpose of containing the melt within the reactor containment. The decay heat is carried away partially through the walls of the container and partially from the surface of the melt in the container.

If removal of the heat produced during a core-melt-down accident fails it is easily possible that structural portions of the nuclear reactor or even parts of the containment are melted. The core catching devices known so far will then no longer afford sufficient protection.

The possibility of injecting water into the containment for the purpose of cooling the core can be considered only for water — or gas-cooled reactors and only if the problems associated with the formation of hydrogen are solved. However, it is not possible to inject water into the containment for the cooling of cores of liquid metal cooled reactors.

It has been proposed to provide core catching pans consisting of uranium dioxide or thorium dioxide. The fabrication of such pans, however, would be extremely difficult if at all possible because of the adverse mechanical properties of these ceramic materials. In addition, the costs of manufacturing core catching pans of these materials would be very high.

SUMMARY OF THE INVENTION

Apparatus for containing the components of a nuclear reactor core, particularly a liquid metal cooled reactor core, during a core-melt-down accident. The apparatus comprises a container adapted to be disposed below the core of the nuclear reactor and consisting at least at its inside adjacent the reactor core of graphite, carbide or combinations of graphite fibers and at least one compound of the group consisting of carbides, borides and silicides to avoid melting of the container and contamination of the reactor containment and its surroundings.

BRIEF DESCRIPTION OF THE DRAWINGS

Identical numerals used in all figures indicate the same elements.

DESCRIPTION OF THE PREFERRED EMBODIMENTS

Figure 1:
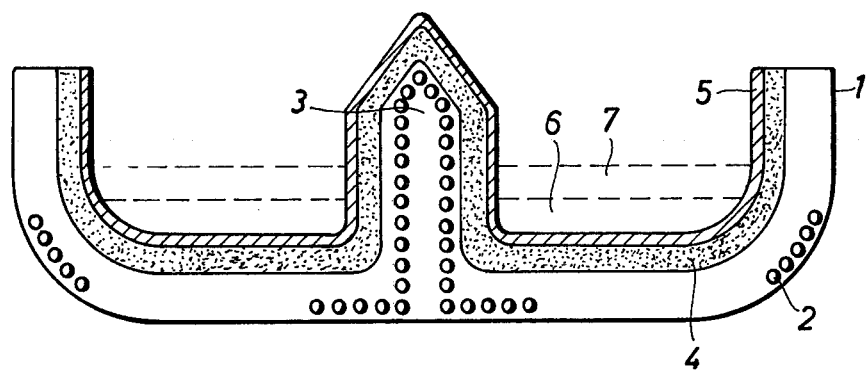
FIG. 1 shows schematically the apparatus adapted to be disposed below the core of a nuclear reactor.

As shown in FIG. 1 the apparatus consists of a container 1 provided with cooling passages 2 and having a conical element 3 disposed in its center for the distribution of parts falling from a melting core during a core melt-down accident. The container 1 has at its inner side (adjacent the core) a layer of graphite 4 on top of which is disposed a protective layer 5 consisting for example of $B_4C$ or a combination of compounds such as $Hf\ B_2$, $WSi_2$, graphite. The interrupted lines inside the container 1 designate the surfaces of a layer of molten nuclear fuel 6 and of a metal melt 7 disposed above the nuclear fuel melt 6 because of the lower specific weight of the metal melt 7.

Figure 2:
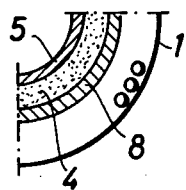
FIGS. 2, 3 and 4 are views of sections of the apparatus showing various layer arrangements in accordance with the invention.

In one embodiment of the invention as shown in FIG. 2, additionally, a stainless steel layer 8 is disposed on the container surface below the protective layer 5. Otherwise, the arrangement of FIG. 2 is the same as that shown in FIG. 1.

Figure 3:
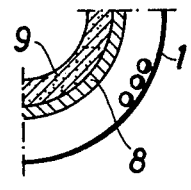

As shown in the embodiment of FIG. 3, the container 1 may also have a stainless steel layer 8 disposed on its inner surface as in the example of FIG. 2 but, instead of the graphite layer 4 and the protective layer 5 of the arrangement of FIG. 2, there is provided a mixed layer 9 consisting of graphite with $B_4C$ homogeneously distributed throughout the graphite.

Figure 4:
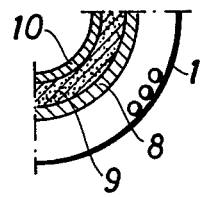

The arrangement of FIG. 4 is essentially the same as described with reference to FIG. 3 but, additionally, it is provided with a metallic layer 10 consisting, for example, of stainless steel.

There are, of course, combinations of layers possible other than those specifically described. The container could, for example, be made completely from compressed graphite or, as already described, the graphite may be provided only as a protective layer on the container which itself consists of metal. The protective layer may also consist of carbides or a composition of graphite fibers and carbides, borides and/or silicides. It is advantageous if the protective layer is covered by a metal cover which is inactive toward the reactor coolant and protects the lower layers during normal operation of the reactor. As indicated such cover preferably consists of stainless steel. If graphite is used as container material or as a layer on the inside of the container the graphite surface on the inside of the container is provided with a layer of boron carbide or boron nitride.

Preferably, the container consists, at its inner surface area, of at least one of the group of compounds including $B_4C$, $Al_4C_3$, $\alpha$-SiC, $\beta$-SiC, TiC, BN, $TiB_2$, $ZrB_2$, $VB_2$, $NbB_2$, $WSi_2$, $HfB_2$, $WSi_2$ and graphite.

With regard to the possibility of accumulation of critical masses it is advantageous to use containers consisting generally of graphite or of stainless steel with a layer of graphite and a top layer of boron carbide rather than $UO_2$ containers. The layer of boron carbide should have a thickness of 5 mm or more. The result improves up to a boron carbide layer thickness of 20 mm. Additional thickness does not essentially improve the container properties.

Instead of forming a top layer, the boron carbide may of course be distributed within the graphite layer. A graphite layer of 250 mm thickness containing 1 atomic wt. % $B_4C$ homogeneously distributed therein is about equivalent to a $B_4C$ top layer of 20 mm. Calculations show that with a 250 mm graphite layer containing 10 atomic wt. % $B_4C$ the critical mass value is increased by 20% or even by 43% if there are no neutron reflections from the bottom of the container or if reflections from the bottom of the container are disregarded. These values however depend greatly on the form of the fuel body in the container and are, for example, much greater for containers with increased diameters that is far flatter fuel melt bodies. Furthermore, instead of the naturally occurring boron, B10 - enriched boron (for example with 65% enrichment) may be used, which brings even further improvements. Containers including such enriched boron are particularly advantageous for small liquid metal cooled reactors where they could be disposed below the reactor vessels or for pool reactors where they could be disposed within the reactor vessels.

The apparatus according to the invention is easy and inexpensive to manufacture. Furthermore, the physical properties of the materials under consideration provide a high heat conductivity and resistance to corrosion. Particularly, as it is desirable, the heat conductivity of the materials is higher than of a core melt which might be contained in the apparatus.

What is claimed is:

1. Apparatus for containing the components of a nuclear reactor core in a core melt-down accident, said apparatus consisting of a container adapted to be disposed below the neclear reactor core and consisting of stainless steel provided with a layer of compressed graphite, and having disposed at its inside facing the reactor core on top of the compressed graphite layer a top layer of graphite in combination with at least one compound of the group consisting of $Al_4C_3$, $\alpha$-SiC, $\beta$-SiC, $TiB_2$, $ZrB_2$, $HfB_2$, $NbB_2$ and $WSi_2$.

2. Apparatus for containing the components of a nuclear reactor core in a core melt-down accident, said apparatus consisting of a container adapted to be disposed below the nuclear reactor core and consisting of a highly heat resistant material, said container comprising, at its inside facing the reactor core, a top layer of graphite fibers mixed with at least one compound of the group consisting of carbides, borides, and silicides.

3. Apparatus as recited in claim 2, wherein the container consists of stainless steel provided with a layer of compressed graphite said top layer being disposed on top of said compressed graphite layer.

4. Apparatus for containing the components of a nuclear reactor core in a core melt-down accident said apparatus consisting of a container adapted to be disposed below the nuclear reactor core and consisting of a highly heat resistant material, said container comprising, at its inside facing the reactor core, a top layer of graphite in combination with at least one compound of the group consisting of $Al_4C_3$, $\alpha$-SiC, $\beta$-SiC, $TiB_2$, $ZrB_2$, $BV_2$, $HfB_2$, $NbB_2$ and $WSi_2$, and a metallic cover disposed on the inner surface of the container overlaying said top layer which metallic cover is inactive toward the reactor coolant during normal operation of the reactor.

5. Apparatus for containing the components of a nuclear reactor core in a core melt-down accident said apparatus consisting of a container adapted to be disposed below the nuclear reactor core and consisting of a combination of graphite fibers with at least one compound of the group consisting of $Al_4C_3$, SiC, $ZrB_2$, $HfB_2$, and $WSi_2$, said container comprising, at its inside facing the reactor core, a top layer of a combination at least one of $HfB_2$ and $WSi_2$ with graphite.

* * * * *